United States Patent Office 2,753,321
Patented July 3, 1956

2,753,321

WHITE OR PASTEL PIGMENTED VINYLIDENE CHLORIDE COPOLYMER WITH IMPROVED COLOR RETENTION PROPERTIES

Austin L. Jankens, Bay City, Mich., assignor to The Dow Chemical Company, Midland, Mich., a corporation of Delaware No Drawing. Application May 15, 1952,
Serial No. 288,036

9 Claims. (Cl. 260—41)

This invention relates to a method and composition for improving the "initial color" and the "shelf life" of white or pastel pigmented vinylidene chloride copolymer molded and extruded articles. It relates in particular to the accomplishment of said improvement in extruded and oriented filaments of normally crystalline vinylidene chloride copolymers.

Much attention has been paid to agents which can be added to vinylidene chloride polymers and copolymers to stabilize these polymers against the degradation which is induced by exposure to light, and many such agents are known. In general, the presence of one of these agents in the composition prevents the latter from turning as dark on exposure to light as when the agent is omitted. In the main, however, the known light stabilizers do not prevent discoloration, they simply reduce the extent of such change. Other agents, employed to stabilize the same polymers against thermally-induced degradation, permit the polymers to be heated without as much decomposition as when the agents are omitted. Combinations of heat and light stabilizers are usually employed in vinylidene chloride polymer and copolymer compositions to be molded and extruded, but such compositions, though far superior to the unprotected polymers, are usually unsatisfactory when white or pastel pigmented molded or extruded articles are produced therefrom.

An especially acute problem exists with respect to white and pastel pigmented oriented crystalline filaments of high vinylidene chloride copolymers. In order to extrude the copolymer composition, a heat stabilizer has been thought to be needed so that the composition does not darken materially as a result of thermal decomposition during extrusion. The most generally satisfactory heat stabilizers are basic materials such as alkaline phosphates or polyphosphates, such as disodium orthophosphate, tetrasodium pyrophosphate, tribarium orthophosphate, or basic phosphites, such as basic lead phosphite, or sodium organic phosphates, salts of organic acids, and similar compounds. To assure intimate admixture of such stabilizers with the polymer, and to avoid mechanical difficulty during extrusion, the stabilizers are added as an aqueous solution or dispersion to the freshly prepared and usually porous polymer particles. When the so-treated polymer particles are dried, blended with plasticizers and white or pastel pigments, and extruded to produce filaments, it is disturbing to note that the filaments lack the desired initial whiteness (or lightness of other shades). Still more disturbing is the fact that such extruded filaments, when stored without exposure to light for a few weeks or months, gradually become discolored, and this despite the fact that other samples of the same filaments show a high degree of "light stability" (negligible darkening) when exposed to ultra violet radiations for prolonged periods. There must be a difference, then, between the factor heretofore known as light stability and those factors which affect the initial color and the shelf life of the white or pastel pigmented filaments. It is obvious that a filament which becomes discolored during storage or shipment cannot be woven into satisfactory fabrics along with other filaments having different histories, as there cannot be faithful reproduction of the same shades or patterns.

For the purposes of the present application, the following definitions are given: "Light stability" is defined as a measure of the extent of discoloration of a copolymeric vinylidene chloride article when the latter is exposed to light for prolonged periods. "Initial color" is a term here applied to a freshly extruded or molded article of such copolymer as a measure of its whiteness, or of its faithfulness to some desired pastel shade. "Shelf life" is a measure of the faithfulness to or lack of deviation from the intended color of an extruded or molded copolymeric vinylidene chloride article which has been stored away from direct exposure to light for a specified period. It should be apparent that the product acceptable to industry is the one with a high light stability, a high degree of initial faithfulness to the intended color, and high retention of that color in storage.

It is an object of the present invention to provide a white or pastel pigmented plastic composition based on a high vinylidene chloride copolymer which will yield molded or extruded articles having high light stability, high initial color faithfulness, and, preferably, a long shelf life without material deviation from the intended color. A particular object is to provide such a composition from a crystalline copolymer of vinylidene chloride and vinyl chloride.

The composition of the present invention, whereby the foregoing and related objects are attained, consists essentially of a predominantly vinylidene chloride polymer or copolymer, a plasticizer, an organic light stabilizer, an alkaline phosphate or other basic stabilizer, a white or light colored pigment and a color stabilizer selected from the class consisting of aliphatic di- and tricarboxylic acids and their anhydrides and mixtures of these with their alkali metal salts, the said acids, anhydrides and salts having from 0 to 2 hydroxyl groups in the chain and being otherwise free from functional substituents.

Compositions of the copolymer, plasticizer, organic light stabilizer and white pigment may have good initial whiteness near 90 per cent when extruded, but they discolor badly after exposure for only 10 to 12 hours in the Fadeometer. When the composition is modified by the addition of a basic stabilizer, initial whiteness, measured spectrophotometrically, drops to a value of 80 to 83 per cent, though the composition does not discolor after 140 hours in the Fadeometer. The shelf life is also very poor, as the whiteness of stored samples of the extruded composition after 30 days is of the order of 74 to 78 per cent. When, however, the composition is further modified by the incorporation of one or more of the above-listed acids or anhydrides, in the proportions given hereinafter, the light stability remains unchanged, initial whiteness is from 85 to 90 per cent and the whiteness after 90 days in storage is within 2.5 per cent of the initial value. These points are illustrated by the following examples, in which stability, whiteness and shelf life are measured on extruded filaments, 0.010 inch in diameter.

1. Composition

| | |
|---|---|
| Copolymer 85 per cent vinylidene chloride, 15 per cent vinyl chloride | 86 |
| Plasticizer (di-α-phenylethyl ether) | 8 |
| Light stabilizer (salol) | 5 |
| White pigment ($TiO_2$) | 1 |
| Initial whiteness | 85 |
| Light stability (Fadeometer)—Brown in less than 10 hours. | |

2. Composition

| | |
|---|---|
| Copolymer 85 per cent vinylidene chloride, 15 per cent vinyl chloride | 86.5 |
| Plasticizer (tributyl aconitate) | 8 |
| Light stabilizer (salol) | 4 |
| White pigment ($TiO_2$) | 1 |
| Basic stabilizer ($Na_4P_2O_7$) | 0.5 |

Initial whiteness:
- Average, 10 batches _____ 81.5
- Range, 10 batches _____ 77.7 to 83.1

Light stability (Fadeometer)—no browning in over 140 hours.

Shelf life, whiteness after 30 days:
- Average _____ 77.2
- Range _____ 75.3 to 79.1

Loss of whiteness, 30 days:
- Average _____ 4.3
- Range _____ 2.4 to 6.1

3. Composition

| | |
|---|---|
| Copolymer 85 per cent vinylidene chloride, 15 per cent vinyl chloride | 86.1 |
| Plasticizer (tributyl aconitate) | 8 |
| Light stabilizer (salol) | 4 |
| White pigment ($TiO_2$) | 1 |
| Basic stabilizer ($Na_4P_2O_7$) | 0.5 |
| Color stabilizer (citric acid) | 0.4 |

Initial whiteness, range (average of 10 underlined) _____ 90.5–91.4–92.3

Shelf life:
- 30 day whiteness _____ 89.9–90.6–92.0
- 60 day whiteness _____ 89.3–90.1–91.4
- 90 day whiteness _____ 88.5–89.6–90.7

Light stability (Fadeometer)—no browning in over 140 hours.

The citric acid of the foregoing Example 3 was replaced in otherwise identical compositions by numerous other of the above-identified color stabilizers, the compositions were extruded to form filaments 0.010 inch in diameter, and the initial whiteness was measured and compared with the whiteness of samples which were stored in the dark for 30 and 90 days. The following table gives the results obtained with a variety of typical color stabilizers in the recited class:

| Color Stabilizer | Whiteness | | |
|---|---|---|---|
| | Initial | 30-day | 90-day |
| Chloromaleic anhydride | 87.2 | 86.9 | 86.0 |
| Sebacic acid | 85.9 | 85.2 | 84.4 |
| Aconitic acid | 88.3 | 88.2 | 86.0 |
| Maleic anhydride | 88.9 | | 86.9 |
| Fumaric acid | 85.4 | 85.4 | 83.0 |
| Citric acid 0.35%; maleic anhydride 0.05% | 88.9 | 87.6 | 87.5 |
| Tartaric acid | 85.5 | 84.8 | 83.1 |
| Di-isobutenyl succinic anhydride | 88.4 | 88.1 | 86.5 |
| Malonic acid | 89.3 | 89.2 | 87.8 |
| Oxalic acid-sodium oxalate | 87.2 | | 86.8 |
| Sodium oxalate 0.75%; maleic anhydride 0.05% | 89.4 | | 89.0 |

No significant change was noted in the stored samples beyond 90 days. Each of the above-noted compositions showed no objectionable discoloration when exposed to ultra-violet radiations in a Fadeometer for over 100 hours or in Florida sunlight for 125 ultraviolet hours.

The compositions reported in Example 3 and the subsequent table were all based on the same copolymer, plasticizer, light stabilizer, white pigment and basic stabilizer so that the differences resulting from the use of the various color stabilizers could be evaluated properly. Changes may be made as to each constituent within the following limits. The polymeric material may be any in which vinylidene chloride predominates. The problem is most acute with the normally crystalline polymers, and these usually contain at least 70 per cent of vinylidene chloride. The plasticizer and the organic stabilizer may be any of the known agents for these purposes. Since most of the organic stabilizers have some plasticizing action, the same agent may sometimes be used for both purposes, and the combined amounts of the material or materials used to serve both functions should be in the range from 10 to 20 per cent of the composition. The pigment employed may be any of the customary white or light colored pigments used in the plastics and the paint industries. The amount of the pigment may range from 0.2 to 2 per cent of the composition. The basic stabilizer, examples of which have been given above, should be present in amounts from 0.1 to 2 per cent, and usually from 0.4 to 1 per cent of the composition. Finally, the color stabilizer should be at least 0.05 per cent, but need not exceed 1 per cent of the composition.

It is apparent from the examples that the problem here solved is not the after-bleaching of thermally induced color, nor the mere prolongation of the period of safe exposure to ultraviolet radiations, but is that of providing a composition which, when molded or extruded, has and retains the intended light color whether or not the product is exposed to light.

I claim:

1. The composition claimed in claim 8, wherein the polymeric material is a normally crystalline vinylidene chloride copolymer.

2. The composition claimed in claim 1, wherein the polymeric material is a normally crystalline copolymer of vinylidene chloride and vinyl chloride.

3. The composition claimed in claim 8, wherein the basic salt is an alkali metal salt of an oxyacid of phosphorous.

4. The composition claimed in claim 3, wherein the basic salt is tetrasodium pyrophosphate.

5. The composition claimed in claim 8, wherein the color stabilizer comprises citric acid.

6. The composition claimed in claim 5, wherein the color stabilizer is a mixture of citric acid and maleic anhydride.

7. The composition claimed in claim 8, wherein the color stabilizer comprises malonic acid.

8. In a thermoplastic composition consisting essentially of a predominantly vinylidene chloride polymeric material, a plasticizer, an organic light stabilizer for the polymer, a small amount of a pigment to produce a light shade in the composition, and from 0.1 to 2 per cent of a basic salt of an oxyacid of phosphorus, the improvement which consists in the inclusion in such composition of from 0.05 to 1 per cent of at least one color stabilizer for the composition, selected from the group consisting of aliphatic di- and tricarboxylic acids and their anhydrides and mixtures of these with their alkali metal salts, the said acids and anhydrides having from 0 to 2 hydroxyl groups in the chain and being otherwise free from functional substituents; said composition being characterised by exhibiting an initial light color when extruded and by retention of that color in storage.

9. An extruded filament of the composition claimed in claim 8.

References Cited in the file of this patent

UNITED STATES PATENTS

| | | |
|---|---|---|
| 2,316,196 | Tucker | Apr. 13, 1943 |
| 2,439,677 | Shapiro | Apr. 13, 1948 |
| 2,477,611 | Irons | Aug. 2, 1949 |
| 2,490,247 | Amberg | Dec. 6, 1949 |
| 2,507,142 | Chaban | May 9, 1950 |